(12) United States Patent
Neufeld et al.

(10) Patent No.: US 9,071,122 B2
(45) Date of Patent: Jun. 30, 2015

(54) DRIVE UNIT WITH A FIRST AND A SECOND MOTOR

(75) Inventors: Daniel Neufeld, Herzogenaurach (DE); Guenter Schmid, Nuremberg (DE); Ralf Schueler, Wichtshausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1173 days.

(21) Appl. No.: 13/058,609

(22) PCT Filed: Jul. 30, 2009

(86) PCT No.: PCT/DE2009/001061
§ 371 (c)(1),
(2), (4) Date: Sep. 12, 2011

(87) PCT Pub. No.: WO2010/017800
PCT Pub. Date: Feb. 18, 2010

(65) Prior Publication Data
US 2012/0017539 A1 Jan. 26, 2012

(30) Foreign Application Priority Data
Aug. 14, 2008 (DE) .......................... 10 2008 037 707

(51) Int. Cl.
| | |
|---|---|
| *B67B 3/20* | (2006.01) |
| *H02K 41/02* | (2006.01) |
| *H02K 7/08* | (2006.01) |
| *H02K 11/00* | (2006.01) |
| *H02K 16/00* | (2006.01) |

(52) U.S. Cl.
CPC .................. *H02K 41/02* (2013.01); *H02K 7/08* (2013.01); *H02K 11/0015* (2013.01); *H02K 16/00* (2013.01); *H02K 2201/18* (2013.01)

(58) Field of Classification Search
CPC ....... H02K 41/03; H02K 16/00; H02K 21/14; H02K 7/06; H02K 41/02
USPC ........... 53/490, 317, 318, 334, 285, 420, 484, 53/485; 310/12.14
See application file for complete search history.

(56) References Cited

U.S. PATENT DOCUMENTS

| | | | |
|---|---|---|---|
| 6,211,591 B1* | 4/2001 | Kowalski et al. | 310/80 |
| 6,777,834 B2* | 8/2004 | Wittenstein et al. | 310/12.19 |
| 2006/0242929 A1* | 11/2006 | Servadei et al. | 53/490 |

FOREIGN PATENT DOCUMENTS

| | | |
|---|---|---|
| DE | 100 25 351 A1 | 11/2001 |
| DE | 20 2004 015 097 U1 | 9/2005 |
| EP | 0 797 287 A | 9/1997 |
| GB | 2 097 197 A | 10/1982 |
| GB | 2097197 A * | 10/1982 |
| WO | 01/89773 A | 11/2001 |

* cited by examiner

*Primary Examiner* — Thanh Truong
*Assistant Examiner* — Chelsea Stinson
(74) *Attorney, Agent, or Firm* — Simpson & Simpson, PLLC

(57) ABSTRACT

A drive unit, which has a first motor and a second motor, for rotationally and linearly moving a working element with respect to a first housing element In order to permit a design and a mounting and to reduce the required axial installation space and cost, the drive unit has bearing arrangement which, in the case of a linear movement of the working element with respect to the first housing element, permits a primary part and a secondary part of the first motor and/or of the second motor to be arranged in an axially non-displaceable fashion.

17 Claims, 6 Drawing Sheets

DRIVE UNIT WITH A FIRST AND A SECOND MOTOR

CROSS-REFERENCE TO RELATED APPLICATIONS

This application is a 371 of PCT/EP2009/001061 filed Jul. 30, 2009, which in turn claims the priority of DE 10 2008 037 707.4 filed Aug. 14, 2008, the priority of both applications is hereby claimed and both applications are incorporated by reference herein

FIELD OF THE INVENTION

The present invention relates to a drive unit for rotationally and linearly moving a working element with respect to a first housing element, with the drive unit comprising a first and a second motor.

BACKGROUND OF THE INVENTION

Drive units of this kind, which enable two objects to rotate relative to one another and, at the same time as and/or independently of the rotation, to move linearly relative to one another, can be used in a wide variety of applications.

A typical field of use is in screw-type closing means which are used in systems for automatically closing beverage containers. For this purpose, the working element, typically a rotationally symmetrical shaft, is coupled to a closing head in a rotationally fixed and axially non-displaceable manner in relation to the rotation axis of the working element. The closing head is matched to the shape of the respective beverage containers, such as PET or glass bottles. Since the working element, and therefore the closing head, moves rotationally and linearly with respect to the first housing element, the beverage container, which is arranged in a non-moveable manner with respect to the first housing element, can be closed. In this case, it is necessary to ensure that the closure cover is screwed on as far as its end position, so that the liquid within the beverage container is sufficiently effectively sealed off from environmental influences, such as ambient air and germs, until the promised expiration date. In addition, the so-called sealing ring has to be handled without being damaged and snap on in an interlocking manner. In addition, the screw-on torque must not be unduly high for the user of the bottle. The effective capacity of such screw closing means can be up to 65,000 bottles per hour.

A further field of application for drive units of this generic type is in screwing together two or more machine parts which are provided with in each case an internal and external thread or a passage hole. Turning screws in threaded holes should be mentioned by way of example here, with it often also being necessary to monitor the process in respect of the screw-in torque in this application, for example in the case of safety-relevant components in the vehicle or the aircraft industry.

Further fields of application for drive units of this generic type can be found in automation engineering, for example in automatic assembly and test machines, or in productronics, for example in automatic component mounting machines or in in-circuit testers.

A drive unit of this generic type is known from DE 100 25 351 A1 where this apparatus has a linear motor and a rotational motor. Both the linear motor and the rotational motor from DE 100 25 351 A1 are formed by permanent magnets, which are arranged on the working element, in this case a rotationally symmetrical shaft, and coils which surround the permanent magnets and are arranged in a housing. In order to ensure a constant drive power of the motors over the possible travel of the working element, the cylindrical air gap area which forms between the permanent magnets and the coils always has to be constant. In DE 100 25 351 A1, this is achieved by the axial extent of the permanent magnets extending beyond the axial extent of the coils in accordance with the value of the maximum travel. However, this results in high costs, design and assembly is complicated and a large axial installation space is required.

Object of the Invention

The present invention is based on the object of providing a drive unit of the kind mentioned at the outset which overcomes the disadvantages described herein.

SUMMARY OF THE INVENTION

According to the invention, this object is achieved by virtue of a drive unit for rotationally and linearly moving a working element with respect to a first housing element, that has a first and a second motor, which is distinguished by bearing means which make it possible, in the case of the first and/or the second motor, for a primary part and a secondary part of the motor to be arranged in an axially non-displaceable manner with respect to one another when the working element is moved linearly in relation to the first housing element. Since, in the case of this motor, a linear displacement between the primary part and the secondary part in the axial direction, that is to say along the rotation axis of the working element, does not take place during operation of the drive unit despite linear displacement of the working element with respect to the first housing element, the excess axial length, which is known from the prior art, either of the primary part or of the secondary part is no longer necessary. Therefore, it is possible, in the case of at least one motor, to select the axial extent of the primary part to be of equal length to the axial extent of the secondary part. The costs of the primary part and of the secondary part, and therefore of this motor overall, are reduced as a result, construction and assembly are simplified and the axial installation space taken up by the motor is reduced. of the drive unit despite linear displacement of the working element with respect to the first housing element, the excess axial length, which is known from the prior art, either of the primary part or of the secondary part is no longer necessary. Therefore, it is possible, in the case of at least one motor, to select the axial extent of the primary part to be of equal length to the axial extent of the secondary part. The costs of the primary part and of the secondary part, and therefore of this motor overall, are reduced as a result, construction and assembly are simplified and the axial installation space taken up by the motor is reduced.

According to a first embodiment, the aspect of the present invention is realized by the bearing means comprising a first threaded spindle and a first threaded nut, with the first threaded nut being arranged in an axially non-displaceable manner in relation to the first housing element and being coupled to the primary part or to the secondary part of the first motor in a rotationally fixed manner.

The threaded spindle, in conjunction with the threaded nut, can convert a rotational movement into a translatory movement. In the process, the invention makes use of the fact that a translatory or linear movement of the threaded spindle can be achieved solely by rotating the threaded nut. Therefore, the threaded nut only has to be mounted such that it can be rotated about an axis of the threaded spindle, and can be arranged in an axially non-displaceable manner in relation to the axis of the threaded spindle.

According to the invention, the threaded nut should now be arranged in an axially non-displaceable manner in relation to the first housing element. A translatory movement of the threaded spindle can therefore be achieved without the machine element which is to be driven, specifically the threaded nut, having to be axially displaced with respect to the first housing element for this purpose.

On account of the first motor being coupled to the threaded spindle and to the threaded nut, in particular since the threaded nut is coupled to the primary part or to the secondary part of the first motor in a rotationally fixed manner, it is not necessary for the primary part to be axially displaceable with respect to the secondary part in the case of a linear movement of the working element. Therefore, the axial extent of the primary part and the axial extent of the secondary part of the first motor can be selected to be of equal length. The costs of the primary part and of the secondary part, and therefore of the first motor overall, are reduced as a result, construction and assembly are simplified and the axial installation space taken up by the motor is reduced.

It is further advantageous for a specific transmission ratio between the motor rotation speed and the speed of the working element to be achieved by virtue of the pitch of the threaded spindle and/or of the threaded nut. It is therefore possible, by selecting the appropriate pitch, to operate the motor close to or at its optimum operating point at a given speed of the working element.

According to a second embodiment, the aspect of the present invention is realized by the bearing means comprising a linear bearing which is coupled to the second motor, with the second motor being a torque motor.

Two machine parts can be linearly displaceably mounted in relation to one another, that is to say a translatory movement of the two machine parts in relation to one another is made possible, by the linear bearing. However, rotation of the two machine elements in relation to one another is prevented. A linear bearing typically comprises a profiled shaft and a correspondingly profiled sleeve which surrounds the shaft. Whereas the shaft is linearly displaceable in the sleeve, the profiling of the shaft and of the sleeve makes it possible to transmit torques. If, for example, the sleeve is now made to perform a rotational movement, the shaft will likewise be rotated.

According to the invention, this is used to the effect that, by virtue of a linear bearing of this kind, rotational movements can be transmitted to the working element which corresponds to the shaft by, for example, the sleeve surrounding the working element being made to perform a rotational movement by means of a motor. However, since the sleeve does not need to be axially displaced with respect to the first housing element in the case of a linear movement of the working element, the axial extent of the primary part and of the secondary part of this motor can be selected to be of equal length. The rotational drive elements are decoupled, specifically, from the linear movement of the working element. The costs of the primary part and of the secondary part, and therefore of the second motor overall, are reduced as a result, construction and assembly are simplified and the axial installation space taken up by the second motor is reduced.

According to a third embodiment, the aspect of the present invention is realized by the bearing means comprising a second housing element which is separate from the first housing element, with the second motor being arranged in the second housing element and the second housing element being linearly moveable with respect to the first housing element by the first motor.

Although this embodiment initially requires a more complex construction since a second, separate housing element is required, this disadvantage is more than compensated for by it now being possible to accommodate the second motor, in this case solely for rotationally driving the working member, in the second housing element, and it being possible for this second motor to operate in relation to the second housing element independently of any possible linear movement of the first motor.

As a result, it is possible, in this embodiment of the invention too, for the primary part and the secondary part of a motor, especially of the second motor, to be selected to be of equal length. The rotational drive elements are decoupled, specifically, from the linear movement of the working element. The costs of the primary part and of the secondary part, and therefore of the second motor overall, are reduced as a result, construction and assembly are simplified and the axial installation space taken up by the motor is reduced.

Refinements of the three embodiments of the aspect of the invention are specified in the dependent claims.

Designs of the first embodiment will be described below.

According to a first design of the first embodiment, the first motor is a torque motor. A torque motor is a rotational motor, that is to say a rotational movement is generated. The primary part and the secondary part are arranged concentrically in relation to one another. These types of motor generally have an iron core and slots. However, iron-free motors can also be used as an alternative. A design in the form of an internal rotor, that is to say the stator is arranged radially outside the rotor, is feasible in the first instance. It goes without saying that a design in the form of an external rotor, that is to say the rotor is arranged radially outside the stator, is also feasible.

According to one design of the first embodiment, a secondary part of the torque motor is arranged on the first threaded nut and/or the first housing element has a cylindrical opening, a primary part of the torque motor being arranged on the inner casing surface of said cylindrical opening. The primary part is an internal rotor since the rotor, in this case the threaded nut, is arranged within the stator, in this case the first housing element. The first torque motor should be designed to be as rotationally symmetrical as possible in this case, so that the torque motor can be accordingly accommodated in the cylindrical opening in the first housing element. It is also feasible for the primary part and/or the secondary part to be formed by segments which are in the form of segments of a circle. In this case, the cylindrical opening can form a substantial portion of the first housing element, that is to say the first housing element substantially comprises a hollow cylinder in this case. It is also feasible for the cylindrical opening to form only a portion of the first housing element. In this case, it is fundamentally true for all embodiments of the present invention, that the first housing element can be closed, half-open or open and serves substantially as a reference point for the movement of the working element.

According to a further design of the first embodiment, the secondary part is formed by permanent magnets which are arranged on the periphery of the first threaded nut and/or the primary part is formed by coils which are arranged on the periphery of the inner casing surface of the opening. Since the rotor, that is to say the threaded nut, is combined with the secondary part, it is possible to dispense with the use of sliding contacts. The motor may be, in particular, a synchronous motor with permanent magnet excitation. The permanent magnets may be magnets based on rare earths.

According to a further design of the first embodiment, the axial extent of the primary part and the axial extent of the secondary part are of equal length. Therefore, the advantages according to the invention come fully into effect even if, for construction and production reasons, minor differences in these axial extents were to be conceivable, and form part of the scope of the invention.

According to a further design of the first embodiment, the second motor is a second torque motor. This second torque motor can be designed, in principle, like the first torque motor. Since a linear movement is already made possible by virtue of the first motor, which is coupled to the first threaded spindle and to the first threaded nut, the second motor can be used solely to generate a rotational movement.

According to one design of the first embodiment, a secondary part of the torque motor is arranged on the first threaded nut and/or the first housing element has a cylindrical opening, a primary part of the torque motor being arranged on the inner casing surface of said cylindrical opening. The primary part is an internal rotor since the rotor, in this case the threaded nut, is arranged within the stator, in this case the first housing element. The first torque motor should be designed to be as rotationally symmetrical as possible in this case, so that the torque motor can be accordingly accommodated in the cylindrical opening in the first housing element. It is also feasible for the primary part and/or the secondary part to be formed by segments which are in the form of segments of a circle. In this case, the cylindrical opening can form a substantial portion of the first housing element, that is to say the first housing element substantially comprises a hollow cylinder in this case. It is also feasible for the cylindrical opening to form only a portion of the first housing element. In this case, it is fundamentally true for all embodiments of the present invention, that the first housing element can be closed, half-open or open and serves substantially as a reference point for the movement of the working element.

According to a further design of the first embodiment, a secondary part of the second torque motor is coupled to the working element in a rotationally fixed and axially non-displaceable manner and/or the first housing element has a cylindrical opening, a primary part of the second torque motor being arranged on the inner casing surface of the cylindrical opening. This is a very simple structure for enabling a rotational movement of the working element. mounted, for example, directly on a cylindrical section of the working element, for example in a cohesive manner by adhesive bonding. It is also feasible to use an adapter element, for example for matching the diameter of the cylindrical section of the working element to the diameter of the inner casing surface of the opening in the first housing element given a prespecified, desired air gap thickness between the primary part and the secondary part.

According to a further design of the first embodiment, the second torque motor is coupled to a linear bearing. In this case, the advantages according to the invention which already came into effect in the case of the first motor also apply in the case of the second motor. Accordingly, on account of the linear bearing, the primary part and the secondary part of the second motor can be of equal length. In particular, permanent magnets of the second torque motor can be arranged on the periphery of a displacement sleeve of the linear bearing and/or the first housing element can have a cylindrical opening, coils of the second toque motor being arranged on the periphery of the inner casing surface of the cylindrical opening. On account of the linear bearing, the linear movement, which is generated by the first motor, is independent of the rotational movement which is produced by the second motor. Accordingly, it is necessary, in the case of a rotation which is produced by the second motor, to perform a corresponding, counteracting correction movement of the first motor in order to suppress a simultaneous linear movement.

According to a further design of the first embodiment, the second torque motor is coupled to a second threaded spindle and to a second threaded nut, with the second threaded nut being arranged in an axially non-displaceable manner in relation to the first housing element and being coupled to the primary part or to the secondary part of the second motor in a rotationally fixed manner. This design also results in the advantages of to the invention which already came into effect in the case of the first motor also applying in the case of the second motor. It is also advantageous here for both motors to be of very similar, or identical, construction. It should be noted that, in this case, the rotational movement and the linear movement of the working element are not independent of one another. Instead, the two movements are each produced by superimposed actuation of the two motors. In this case, it is feasible for a thread of the first threaded spindle and a thread of the second threaded spindle to run in opposite directions. In this case, pure rotation of the working element can be achieved by the two motors, and therefore the two threaded nuts, rotating in the same direction at the same rotation speed. A pure linear movement of the working element can be achieved in this case by the two motors, and therefore the two threaded nuts, rotating in opposite directions at the same rotation speed. Similarly to the design of the first torque motor, a secondary part of the second torque motor can be arranged on the second threaded nut and/or the first housing element can have a cylindrical opening, a primary part of the second torque motor being arranged on the inner casing surface of the cylindrical opening. In particular, the secondary part of the second torque motor can be formed by permanent magnets which are arranged on the periphery of the second threaded nut and/or the primary part of the second torque motor can be formed by coils which are arranged on the periphery of the inner casing surface of the opening in the first housing element.

According to a further design of the first embodiment, the second motor is arranged in a second housing element which is separate from the first housing element, with the second housing element being connected to the first threaded spindle in a rotationally fixed and axially non-displaceable manner. The advantages according to the invention, which already came into effect in the case of the first motor, are also realized in the case of the second motor. Therefore, the second motor, which is mounted in the second housing element, can be used to produce only a rotation. The design of the second motor, in particular the axial extent of the primary part and of the secondary part, is therefore independent of any possible linear movements by the first motor. Therefore, division into a linear movement, specifically of the first motor, and a rotational movement, specifically of the second motor, is possible.

Designs of the second embodiment will be described below.

According to one design of the second embodiment, the first motor is a linear motor. The linear motor may be a solenoid motor, for example. The solenoid motor is distinguished on account of its drive force being independent of the respective rotation positions.

According to a further design of the second embodiment, a secondary part of the linear motor is coupled to the working element in a rotationally fixed and axially non-displaceable manner and/or the first housing element has a cylindrical opening, a primary part of the linear motor being arranged on the inner casing surface of the cylindrical opening. However, on account of the possible linear displacement between the secondary part and the primary part, the axial extent of the primary part and of the secondary part of this linear motor cannot be selected to be of equal length. Strictly speaking, the axial extent of the two elements has to differ by the maximum possible linear travel of the working element.

According to a further design of the second embodiment, a secondary part of the second torque motor is coupled to the working element in a rotationally fixed manner and/or the first housing element has a cylindrical opening, a primary part of the second torque motor being arranged on the inner casing surface of the cylindrical opening. Even if the second torque motor could, in principle, be accommodated in a second housing element, this construction represents an extremely simple design.

Designs of the third embodiment will be described below.

According to one design of the third embodiment, a secondary part of the second torque motor is coupled to the working element in a rotationally fixed manner and/or the second housing element has a cylindrical opening, a primary part of the second torque motor being arranged on the inner casing surface of the cylindrical opening. In this case, the second torque motor can be used solely for generating a rotational movement.

According to a further design of the third embodiment, the secondary part of the second torque motor is formed by permanent magnets which are arranged on the periphery of the working element or an adapter element which is connected to the working element in a rotationally fixed manner and/or the primary part of the second torque motor is formed by coils which are arranged on the periphery of the inner casing surface of the opening in the second housing element. It is also possible for the permanent magnets to be arranged on the working element or the adapter element in a non-displaceable manner.

Designs for all the embodiments will be described below.

According to one design, at least one travel and/or angle measuring system is present. The travel and/or angle measuring system can be, for example, a combined magnetoresistive or inductive angle and/or travel measuring system. It comprises at least one measuring scale, for example with slots both in the longitudinal direction and in the peripheral direction, and also at least one sensing head in which the corresponding sensor system is accommodated.

According to a further embodiment, a torque or force measuring system comprising a current measuring device is present. In particular, the torque or force measuring system should be formed without a corresponding sensor system and without torque limiting clutches. This is achieved, according to the invention, by the actual current value from the respective electrical control circuit which is originally present in the form of a cascaded current, speed and position control circuit, being measured and monitored. In this case, use is made of the actual current value being proportional to the respective motor force or to the respective motor torque in the case of servo drives. In this case, a situation of a limit value for the actual current value being undershot is interpreted as elements, for example closure caps for beverage containers, having been incorrectly screwed. In contrast, a situation of a higher limit value being exceeded indicates elements which have been screwed too tightly. The motor torque M is related to the motor current I by means of a torque constant KM as follows: M=KM*I. The motor force F is related to the motor current I by means of a force constant KF as follows: F=KF*I.

According to a further embodiment, at least one radial and/or axial bearing for supporting the first threaded spindle and/or the second threaded spindle and/or the working element is present. The radial and/or axial bearing serves to support the machine elements with respect to the first or second housing element in such a way that these machine elements can carry out a rotational movement. The radial and/or axial bearing can be, for example, a sliding bearing or a rolling bearing. In particular, the bearing may be an angular contact ball bearing, for example a two-row angular contact ball bearing. Even if a single bearing point with, for example, a tworow angular contact ball bearing is adequate, the drive unit according to the invention generally comprises two bearing points. Rolling bearings are preferably prestressed in order to reduce the radial play and the resulting vibrations, as a result of which wear is reduced, and also in order to increase the accuracy.

According to a further embodiment, the working element and/or the first threaded spindle and/or the second threaded spindle are sealed off to that side which is averted from the first motor. This seal may be a sliding, contact-making shaft seal or a contact-free labyrinthine seal. Therefore, the drive unit according to the invention can be effectively cleaned in a simple manner.

According to a further embodiment, a brake which is independent of the first motor and the second motor is present. This brake is required particularly when the drive unit according to the invention is intended to be arranged vertically. In the event of an emergency switch-off operation or a voltage drop, an inherently safe, force-fitting braking operation is intended to be performed. In this case, the brake may be an electrical, hydraulic or pneumatic brake or a brake which is prestressed against a spring force. As an alternative, weight compensation can also be realized by means of a counterweight or by means of a spring or pneumatic spring instead of a brake. Brake systems of which the manner of operation is based on the attraction force of permanent magnets are also possible. In the case of such systems, no energy supply (current, compressed air etc.) is required, that is to say these systems can also be used as safety apparatus in the event of a sudden voltage drop.

According to a further embodiment, at least one of the motors is an electric servo motor. That is to say, the control system associated with the motor and the associated converter are integrated within the motor housing. Expensive slip rings can be avoided as a result, particularly when a plurality of drive units according to the invention are arranged on a common rotating machine part. As an alternative, the control system and converter can be arranged outside the motor housing and, in particular, facing away from the working element and possibly connected to the motor housing. The electronic assemblies of the control system and the converters are intended to be accommodated and protected in a largely water-tight and pressure-tight stainless steel housing, so that cleaning and disinfection liquids and gases cannot enter.

According to a further design, the working element can be coupled to a closing head for beverage containers. The closing head is adapted to the respective beverage container and can be exchanged in a simple manner. According to a further design, at least the working element has a hole for ejecting closure caps which are located in the closing head. A corresponding ejector can eject incorrectly screwed closure caps through the hole. If appropriate, the first and/or the second threaded spindles and/or further machine elements also have a corresponding hole.

BRIEF DESCRIPTION OF THE DRAWINGS

Exemplary designs of the present invention will be explained below with reference to the attached figures, in which.

DETAILED DESCRIPTION OF THE DRAWING

Figure 1:
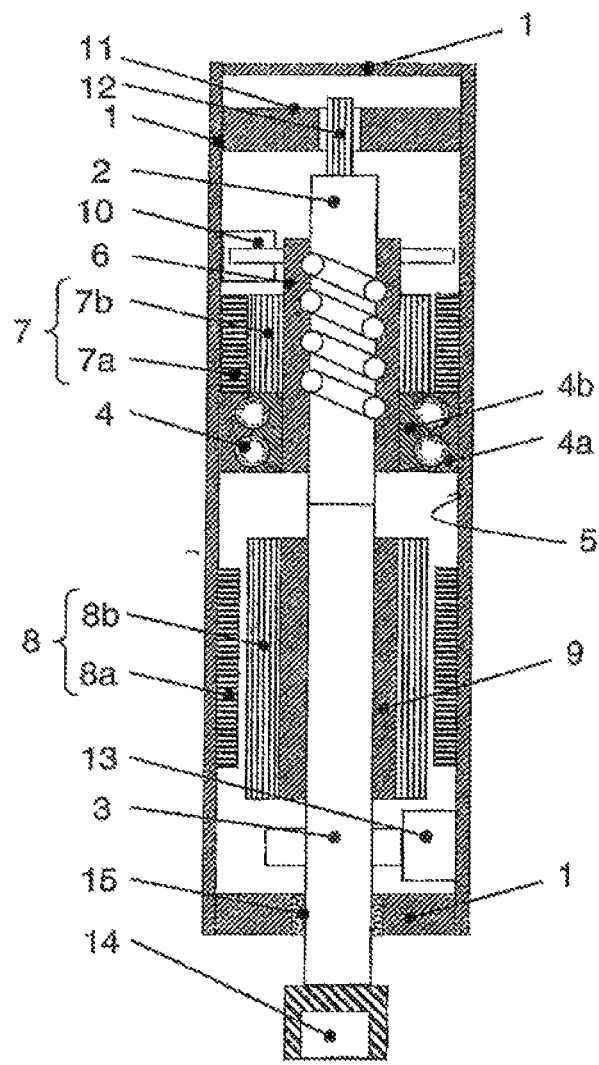
FIG. 1 shows a drive unit according to a first exemplary design.

FIG. 1 shows a drive unit according to a first exemplary design in line with the first embodiment of the invention. A first threaded spindle 2 and a working element 3 are arranged as central elements in a stainless steel housing 1. The threaded spindle 2 may be a ball screw spindle, a horizontal threaded spindle or a trapezoidal threaded spindle. The working element 3 consists of a rotationally symmetrical shaft which is arranged coaxially to the first threaded spindle 2. The first threaded spindle 2 and the working element 3 are connected, for example screwed, clamped or connected in a force-fitting, interlocking or cohesive manner in some other way, to one another in a rotationally fixed and non-displaceable manner. The first threaded spindle 2 has an associated first threaded nut 6. The first threaded nut 6 is rotatably mounted in the first housing element 1 by a prestressed rolling bearing 4. For this purpose, the first threaded nut 6 is connected to the inner ring 4b of the rolling bearing 4 in a rotationally fixed and non-displaceable manner. The rolling bearing 4 is a multi-row rolling bearing, specifically a two-row angular contact ball bearing. The outer ring 4a of the rolling bearing 4 is arranged on the inner casing surface 5 of the first housing element 1 in a rotationally fixed and non-displaceable manner by a press fit.

The first motor 7, which consists of a primary part 7a and a secondary part 7b, is arranged between the first threaded nut 6 and the first housing element 1. In particular, the primary part 7a is arranged on the inner casing surface 5 of the first housing element 1 in a rotationally fixed and non-displaceable manner. In contrast, the secondary part 7b is arranged on the first threaded nut 6 in a rotationally fixed and non-displaceable manner and the air gap in the first motor 7 is be formed between the primary part 7a and the secondary part 7b. The first motor 7 generates a linear movement of the working element 3 by driving the threaded nut 6. Both the primary part 7a and the secondary part 7b are arranged in an axially non-displaceable manner in relation to the first housing element 1, that is to say the primary part 7a and the secondary part 7b are also arranged in an axially non-displaceable manner in relation to one another.

The second motor 8, which consists of a primary part 8a and a secondary part 8b, is arranged between the working element 3 and the first housing element 1. Whereas the primary part 8a is connected directly to the first housing element 1 in a rotationally fixed and non-displaceable manner, the secondary part 8b is connected to the working element 3 in a rotationally fixed and non-displaceable manner by means of an adapter element 9. The adapter element 9 is formed by a sleeve. A direct connection between the secondary part 8b and the working element 3 is also feasible in principle. In order for the axial overlap between the primary part 8a and the secondary part 8b to remain the same size even in the event of a linear movement of the working element 3, in order to keep the torque-forming air gap area constant, the axial extent of the secondary part 8b is larger than the axial extent of the primary part 8a. It would also be feasible for the axial extent of the secondary part 8b to be smaller than the axial extent of the primary part 8a. The second motor 8 generates a rotational movement of the working element 3 which, however, also leads to a linear displacement of the working element 3 without corresponding counteracting correction movements of the threaded nut 6. Therefore, the two movement options are not independent of one another.

The rotation of the threaded spindle 2 is detected by the angle measuring system 10. The angular position of the working element 3 is detected by a further angle measuring system 11 having a measuring scale 12, the further angle measuring system being insensitive in relation to linear movements.

A safety brake 13, which operates independently of the first and the second motor, is coupled to the working element 3. Instead of the safety brake 13, a prestressed compression spring can also be used as a safety means to prevent a crash in the event of a power outage or other machine disturbances and to compensate the weight force.

A closure element 14 which is matched to the closures of the respective beverage containers is arranged at that end of the working element 3 which is averted from the motors. That end of the working element 3 which is averted from the motors is provided with a seal 15 in order to prevent the ingress of impurities into the first housing element 1.

The first housing element 1 preferably has a rotationally symmetrical housing surface with few or no undercuts, openings or holes. As a result, the first housing element can be effectively cleaned very well and in a simple manner. All the housing components, the working element, screws and cable screw connections are manufactured from acid- and alkali-resistant austenitic steel.

Identical or identically acting elements in the following figures are provided with identical reference symbols, and therefore reference is made to the description relating to FIG. 1 in this respect.

Figure 2:
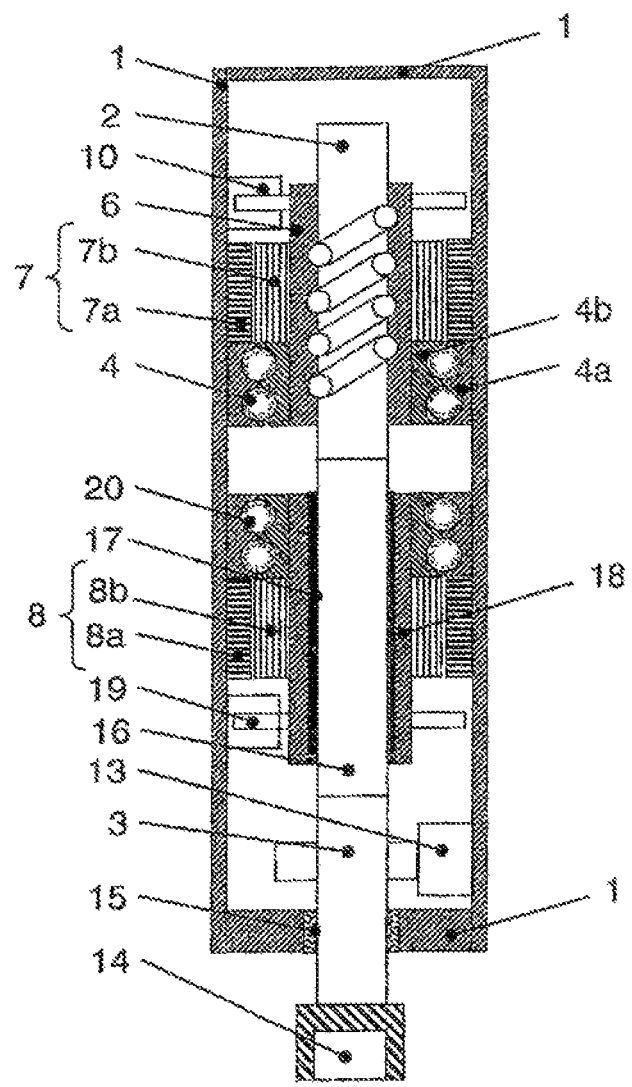
FIG. 2 shows a drive unit according to a second exemplary design.

FIG. 2 shows a drive unit according to a second exemplary design in line with the first embodiment of the invention. The working element 3 is connected to a square or polygonal shaft 16 in a rotationally fixed and axially non-displaceable manner, the square or polygonal shaft, for its part, being guided in a so-called linear bearing 17. The linear bearing 17 comprises a displacement sleeve 18 which is equipped with rows of balls and is designed such that it permits a linear movement with little friction and a rotational movement by the secondary part 8b of the second motor 8 can be impressed into the square or polygonal shaft 16 in an interlocking manner by means of the rows of balls. In order to create a pure linear movement of the working element 3, the first motor 7 drives the threaded nut 6 and the second motor 8 generates a corresponding counter-torque at the same time, and therefore the rotation of the threaded nut 6 is converted only into a linear movement of the working element 3. The primary part 8a of the second motor 8 is connected to the first housing element 1 in a rotationally fixed and axially nondisplaceable manner. The secondary part 8b of the second motor 8 is connected to the displacement sleeve 18 in a rotationally fixed and axially non-displaceable manner. On account of the displacement sleeve 18, the primary part 8a and the secondary part 8b can be formed with an equal length in terms of axial extent.

The secondary part 8b, that is to say the rotor whose angular position is detected by means of an angle measuring system 19, is mounted in a radial/axial bearing 20 by means of the displacement sleeve 18. The radial/axial bearing 20 is formed substantially like the radial/axial bearing 4. It goes without saying that the mounting locations of the first motor and of the second motor can be exchanged.

Figure 3:
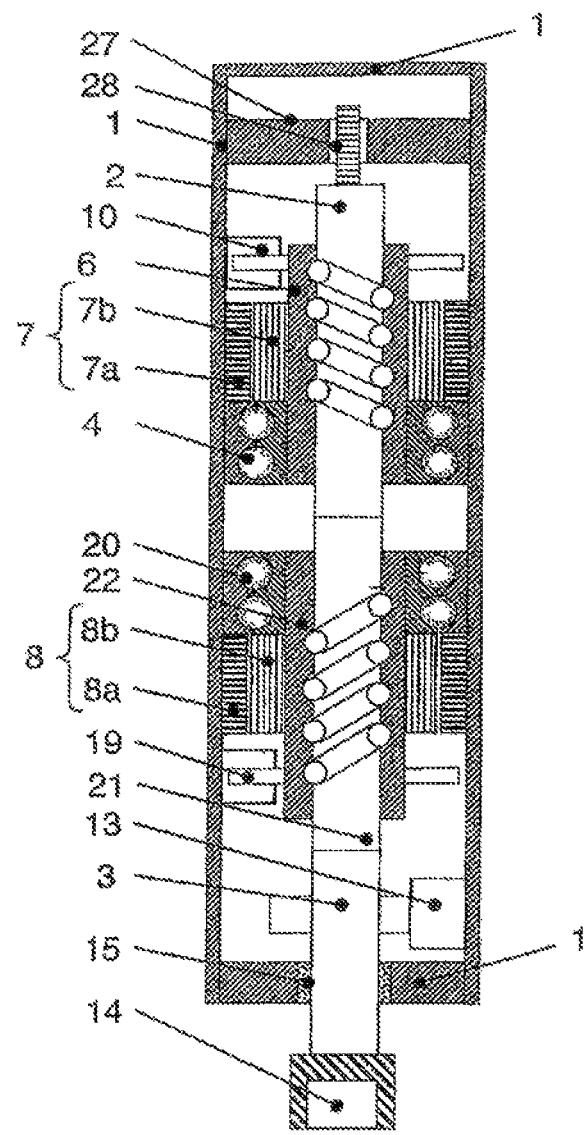
FIG. 3 shows a drive unit according to a third exemplary design.

FIG. 3 shows a drive unit according to a third exemplary design in line with the first embodiment of the invention. The working element 3 is connected to a second threaded spindle 21 in a rotationally fixed and axially non-displaceable manner. The second threaded spindle 21 engages with a second threaded nut 22. The second threaded spindle 21 may, for its part, be a ball screw spindle, a horizontal threaded spindle or a trapezoidal threaded spindle. The second threaded spindle 21 is coupled to the first threaded spindle 2 in a rotationally fixed and axially non-displaceable manner. The arrangement of the second motor 8 in relation to the first housing element 1 and the second threaded nut 22 corresponds substantially to the arrangement of the first motor 7 in relation to the first housing element 1 and the first threaded nut 6. Accordingly, the primary part 8a is connected to the first housing element 1 in a rotationally fixed and axially non-displaceable manner and the secondary part 8b is connected to the second threaded nut 22 in a rotationally fixed and non-displaceable manner. The threaded spindles have threads which rotate differently. The angular position of the secondary parts 7b, 8b, that is to say the rotors, and of the threaded nuts 6, 22 is detected and the motors 7, 8 are commutated and controlled by means of in each case one angle measuring system 10, 19 of hollow shaft design. Furthermore, a single angle transmitter may also be sufficient, the angular position of the threaded spindles being detected with the aid of the angle transmitter. In addition, a travel measuring system 27 having a measuring scale 28 is also integrated, it being possible to detect the linear movement position of the first spindle 2, of the second spindle 21 and of the working element 3 with the aid of the travel measuring system and the travel measuring system being insensitive to rotational movements.

The assembly comprising the first motor 7, the first threaded spindle 2, the first threaded nut 6 and the radial/axial bearing 4 can advantageously be formed in a structurally identical manner to the assembly comprising the second motor 8, the second threaded spindle 21, the second threaded nut 22 and the radial/axial bearing 20. In particular, the motors 7, 8 can be structurally identical torque motors.

The rotational movement and the linear movement of the working element 3 are not independent of one another but are each produced by superimposed actuation of the two threaded nuts 6, 22.

Figure 4:
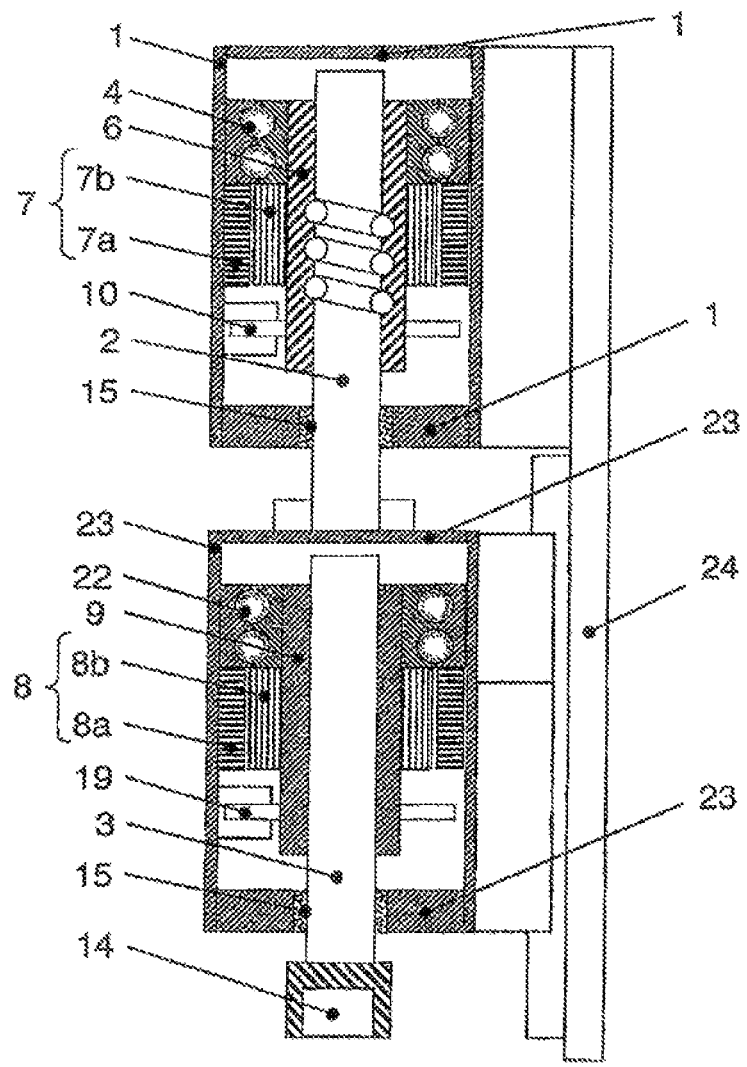
FIG. 4 shows a drive unit according to a fourth exemplary design.

FIG. 4 shows a drive unit according to a fourth exemplary design in line with the first embodiment of the invention. The linear movement of the working element 3 is produced, as according to the exemplary design according to FIG. 2 for example, by the first motor 7 and also a first threaded spindle 2 and a first threaded nut 6. Therefore, reference is made to the description relating to FIG. 2 in relation to the design and the arrangement of the first motor 7. The second motor 8 is accommodated in a second housing element 23. The second housing element 23 has, like the first housing element, a cylindrical hollow space. The second housing element 23 is connected to the first threaded spindle 2 in a rotationally fixed and axially non-displaceable manner. Furthermore, the second housing element 23 is connected to a connection structure 24 in a rotationally fixed manner by means of a linear guide comprising a carriage which is guided by a recirculating ball or roller linear guide. In contrast, the working element 3 is mounted within the second housing element 23 in a rotatable but axially non-displaceable manner. This ensures that a rotational movement of the first threaded nut 6 produces only a linear movement of the second housing element 23 and therefore of the working element 3. On account of the working element 3 being axially fixed within the second housing element 23, the axial extent of the primary part 8a and also of the secondary part 8b of the second motor 8 can be designed with an equal length. The secondary part 8b is connected to the working element 3 in a rotationally fixed and non-displaceable manner by an adapter element 9, with the adapter element 9, for its part, being connected to the working element 3 in a rotationally fixed and non-displaceable manner. The working element 3 is mounted in the second housing element 23 by a radial/axial bearing 22. The inner ring and the outer ring of the radial/axial bearing 22 are connected to the second housing element 23 and, respectively, to the adapter element 9 in a rotationally fixed and non-displaceable manner.

The connection between the first threaded spindle 2 and the second housing element 23 can be designed in such a way that simple exchange of one of the two housing elements is possible.

Figure 5:
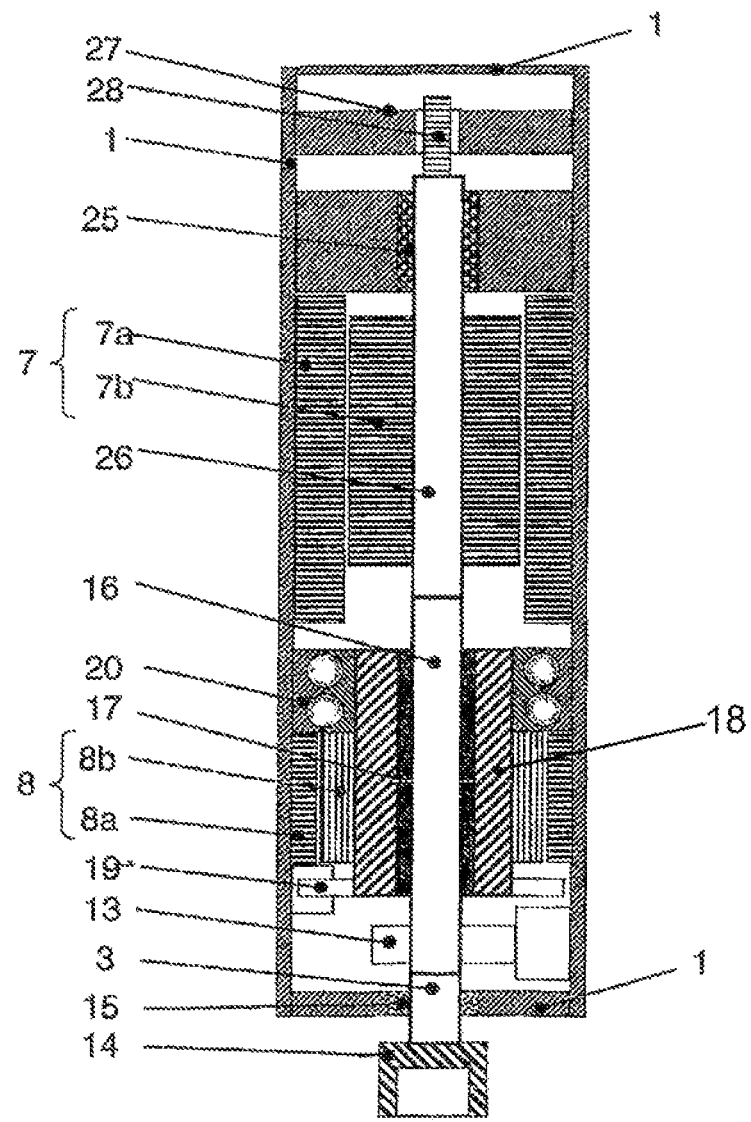
FIG. 5 shows a drive unit according to a fifth exemplary design.

FIG. 5 shows a drive unit according to a fourth exemplary design in line with the second embodiment of the invention. The first motor 7, which is formed by a solenoid motor, is mounted in a ball bushing 25 in the first housing element 1. The secondary part 7b is connected to a rotationally symmetrical shaft 26 in a rotationally fixed and axially non-displaceable manner. The linear travel of the shaft 26 and therefore of the first motor 7 is measured by means of a travel measuring system 27 having a measuring scale 28. This travel measuring system 27 is provided such that it detects a linear movement but is insensitive to rotation. In order to ensure a sufficient degree of overlap between the primary part 7a and the secondary part 7b in any possible axial position of the shaft 26, either the primary part 7a is longer than the secondary part 7b or vice versa, and therefore the force-forming air gap area is constant in every position. The shaft 26 is connected to a square or polygonal shaft 16 in a rotationally fixed and axially nondisplaceable manner, said square or polygonal shaft, for its part, being connected to the working element 3 in a rotationally fixed and axially non-displaceable manner. The square or polygonal shaft 16 is guided in a linear bearing 17. The linear bearing 17 comprises a displacement sleeve 18 which is equipped with rows of balls and is designed such that it permits a linear movement with little friction and a rotational movement by the secondary part 8b of the second motor 8 can be impressed into the square or polygonal shaft 16 in an interlocking manner by means of the rows of balls. In this design, the degree of linear freedom is not linked to the degree of rotational freedom. The second motor 8, a torque motor, can therefore have a primary part 8a and a secondary part 8b with axial extents of equal length. It goes without saying that a transposed arrangement of the first and second motors is also feasible.

Figure 6:
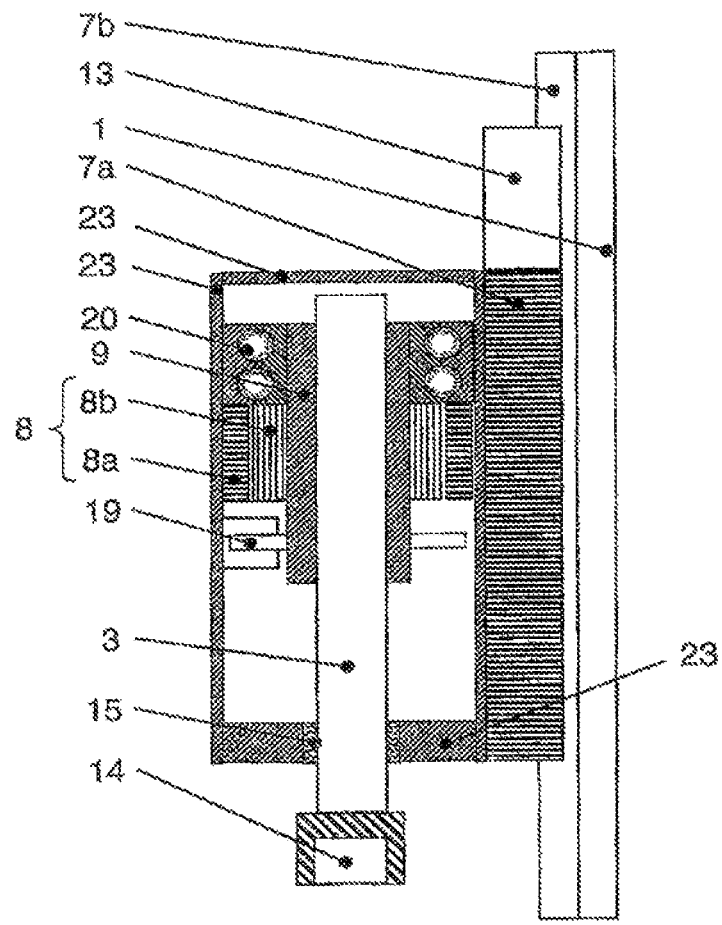
FIG. 6 shows a drive unit according to a sixth exemplary design.

FIG. 6 shows a drive unit according to a fifth exemplary design in line with the third embodiment of the invention. The second motor 8 is accommodated in a second housing element 23 which has a cylindrical hollow space. The second housing element 23 is mounted in a rotationally fixed but linearly displaceable manner with respect to the first housing element 1 by means of a carriage which is guided by a recirculating ball or roller linear guide. The working element 3 is, for its part, mounted in the second housing element 23 in an axially non-displaceable but rotatable manner. The working element 3 is therefore moved linearly solely by displacement of the second housing element 23, this being effected by the first motor 7. The motor 7 consists of a primary part 7a and also a secondary part 7b. The primary part 7a is connected to the second housing element 23 in a rotationally fixed and axially non-displaceable manner. The secondary part 7b is connected to the first housing element 1 in a rotationally fixed and axially non-displaceable manner. The linear movement can be measured and controlled by a linear scale (not illustrated). A safety brake 13 is in the form of a clamping unit in order to prevent further linear movements in the event of an emergency switch-off operation.

LIST OF REFERENCE SYMBOLS

1 Housing element
2 Threaded spindle
3 Working element
4 Radial/axial bearing
4a Outer ring
4b Inner ring
5 Inner casing surface
6 First threaded nut
7 First motor
7a Primary part of the first motor
7b Secondary part of the first motor
8 Second motor
8a Primary part of the second motor
8b Secondary part of the second motor
9 Adapter element
10 Angle measuring system
11 Angle measuring system
12 Measuring scale
13 Safety brake
14 Closure element
15 Seal
16 Square or polygonal shaft
17 Linear hearing
18 Displacement sleeve
19 Angle measuring system
20 Radial/axial bearing
21 Second threaded spindle
22 Second threaded nut
23 Second housing element
24 Connection structure
25 Ball bushing
26 Shaft
27 Travel measuring system
28 Measuring scale

The invention claimed is:

1. A drive unit for rotationally and linearly moving a working element with respect to a first housing element, the drive unit comprising:
   a threaded spindle arranged within the first housing element, the threaded spindle including a threaded nut rotatably mounted in the first housing element, the threaded spindle fixed to the working element;
   a first motor secured within the first housing element and having a primary part and a secondary part;
   a second motor secured proximate the first housing element and having a primary part and a secondary part; and,
   bearing means secured proximate the first housing element and which, in the case of the first and/or the second motor, is operatively arranged to allow for the primary part and the secondary part of the motors to be arranged in an axially non-displaceable manner with respect to one another when the working element is moved linearly in relation to the first housing elements;
   wherein the working element is moveable linearly in a first direction by the first motor driving the threaded nut and the second motor providing a first counter-torque to the working element; and wherein the working element is moveable linearly in a second direction opposite the first direction by the first motor driving the threaded nut, the second motor driving the working element, and the first motor providing a second counter-torque to the working element.

2. The drive unit as recited in claim 1, wherein the first threaded nut is arranged in an axially non-displaceable manner in relation to the first housing element and coupled to the primary part or to the secondary part of the first motor in a rotationally fixed manner.

3. The drive unit as recited in claim 2, wherein the first motor is a first torque motor and/or the second motor is a second torque motor.

4. The drive unit as recited in claim 3, further comprising a linear bearing, the second torque motor being coupled to the linear bearing.

5. The drive unit as recited in claim 3, wherein the second torque motor is coupled to a second threaded spindle and a second threaded nut with the second threaded nut is arranged in an axially non-displaceable manner in relation to the first housing element and coupled to the primary part or to the secondary part of the second torque motor in a rotationally fixed manner.

6. The drive unit as recited in claim 5, further comprising at least one radial and/or axial bearing which supports the first threaded spindle and/or the second threaded spindle and/or the working element.

7. The drive unit as recited in claim 3, further comprising a second housing element separate from the first housing element, the second motor being arranged in the second housing element, the second housing element being connected to the first threaded spindle in a rotationally fixed and axially non-displaceable manner.

8. The drive unit as recited in claim 1, wherein the bearing means comprises a linear bearing which is coupled to the second motor with the second motor being a torque motor.

9. The drive unit as recited in claim 8, wherein the first motor is a linear motor.

10. The drive unit as recited in claim 1, wherein the bearing means comprises a second housing element which is separate from the first housing element, the second motor being arranged in the second housing element and the second housing element being linearly moveable with respect to the first housing element by the first motor.

11. The drive unit as recited in claim 1, wherein an axial extent of the primary part and an axial extent of the secondary part of at least one of the motors are of equal length.

12. The drive unit as recited in claim 1, further comprising at least one travel and/or angle measuring system.

13. The drive unit as recited in claim 1, wherein at least one of the motors is an electric servo motor.

14. The drive unit as recited in claim 1, wherein the working element is couplable to a closing head for beverage containers.

15. The drive unit as recited in claim 14, wherein at least the working element has a hole for ejecting beverage caps located in the closing head.

16. A drive unit for rotationally and linearly moving a working element with respect to a first housing element, comprising:
   a threaded spindle arranged within the first housing element, the threaded spindle including a threaded nut rotatably mounted in the first housing element, the threaded spindle fixed to the working element;
   a first motor secured within the first housing element and operatively arranged to engage the working element; and, a second motor secured proximate the first housing element and operatively arranged to engage the working element, the first and second motors rotatable in a same direction;

wherein the working element is moveable linearly in a first direction by the first motor driving the threaded nut and the second motor providing a first counter-torque to the working element; and, wherein the working element is moveable linearly in a second direction opposite the first direction by the first motor driving the threaded nut, the second motor driving the working element, and the first motor providing a second counter-torque to the working element.

17. A drive unit for rotationally and linearly moving a working element with respect to a first housing element, comprising:

a first assembly within the first housing element, the first assembly operatively arranged to engage the working element and comprising:

a first threaded spindle arranged coaxially with and fixedly secured to the working element, a first thread of the first threaded spindle arranged in a first direction;

a threaded nut rotatably mounted to the first housing element and engageable with the first threaded spindle; and a first motor secured to the housing element and arranged to engage the threaded nut; and, a second assembly formed within the first housing element, the second assembly including:

a second threaded spindle arranged coaxially with and rotationally fixed and axially non-displaceable with respect to the working element, the second threaded spindle having a second thread arranged in a second direction different than the first direction;

a second threaded nut rotatably mounted to the first housing element and engageable with the second threaded spindle; and, a second motor operatively arranged to engage the working element.

\* \* \* \* \*